(12) United States Patent
Lerario

(10) Patent No.: US 10,098,507 B1
(45) Date of Patent: Oct. 16, 2018

(54) SPATULA FORK

(71) Applicant: Joseph F. Lerario, Addison, IL (US)

(72) Inventor: Joseph F. Lerario, Addison, IL (US)

( * ) Notice: Subject to any disclaimer, the term of this patent is extended or adjusted under 35 U.S.C. 154(b) by 0 days.

(21) Appl. No.: 15/701,429

(22) Filed: Sep. 11, 2017

Related U.S. Application Data

(60) Provisional application No. 62/385,803, filed on Sep. 9, 2016.

(51) Int. Cl.
*A47J 43/28* (2006.01)
*A47G 21/02* (2006.01)

(52) U.S. Cl.
CPC .......... *A47J 43/288* (2013.01); *A47J 43/283* (2013.01); *A47G 21/02* (2013.01)

(58) Field of Classification Search
CPC .............................. A47J 43/288; A47J 43/283
USPC .......... 294/7, 8, 9, 10; D7/643, 653; 30/322, 30/323
See application file for complete search history.

(56) References Cited

U.S. PATENT DOCUMENTS

| | | | | |
|---|---|---|---|---|
| 198,245 A | * | 12/1877 | Kellyu | |
| D29,621 S | * | 11/1898 | Pitts | |
| 1,056,614 A | * | 3/1913 | Weikert | A01B 1/16 172/380 |
| 1,432,412 A | | 10/1922 | Rietveld | |
| D63,047 S | * | 3/1923 | Adler | |
| D118,684 S | * | 1/1940 | Mast | D7/643 |
| D168,061 S | * | 10/1952 | Moore | D7/643 |
| 2,765,190 A | | 10/1956 | Mcahren | |
| 2,801,873 A | * | 8/1957 | Faughnder | A47J 43/288 126/9 B |
| D182,346 S | * | 3/1958 | Wachter | D7/667 |
| 3,213,779 A | | 10/1965 | First | |
| 3,464,730 A | | 9/1969 | Gagliardi et al. | |
| 3,730,579 A | | 5/1973 | Mock et al. | |
| D243,381 S | | 2/1977 | Kridos | |
| D261,933 S | | 11/1981 | Smith | |
| D262,859 S | | 2/1982 | Russell | |
| 4,768,819 A | | 9/1988 | Tarlow | |
| D299,997 S | | 2/1989 | Tucker et al. | |
| 4,844,525 A | | 7/1989 | Tarlow et al. | |
| 4,955,971 A | | 9/1990 | Goulter | |
| D316,213 S | | 4/1991 | Skerker et al. | |
| 5,175,933 A | | 1/1993 | Shepherd | |
| D363,861 S | | 11/1995 | Slater | |
| 5,774,994 A | * | 7/1998 | Stein | A47J 37/0786 294/7 |
| D411,080 S | | 6/1999 | Santini | |
| D427,858 S | | 7/2000 | Zemel | |
| D436,810 S | | 1/2001 | Slater | |
| 6,247,736 B1 | | 6/2001 | Esterson et al. | |
| D450,548 S | * | 11/2001 | Veltri | D7/688 |

(Continued)

FOREIGN PATENT DOCUMENTS

EP    0321333 B1    7/1993

*Primary Examiner* — Paul T Chin
(74) *Attorney, Agent, or Firm* — Donald J. Silvert

(57) ABSTRACT

In one example, the present invention relates to a culinary implement that includes: a shank that has a distal end; a spatula blade that, in one embodiment, is substantially flat and has a top side, a bottom side, and a distal edge; and a prong disposed adjacent to the blade; wherein the blade and the prong are connected to the distal end of the shank and the shank either is the handle or is connected to a handle.

18 Claims, 1 Drawing Sheet

(56) References Cited

U.S. PATENT DOCUMENTS

| | | | |
|---|---|---|---|
| D459,638 S | * | 7/2002 | Wang .............................. D7/692 |
| D477,191 S | | 7/2003 | Bull et al. |
| D501,631 S | * | 2/2005 | Sulier ............................ D7/683 |
| D516,392 S | | 3/2006 | DeVries |
| 7,100,953 B1 | | 9/2006 | Tarlow et al. |
| D545,645 S | | 7/2007 | Lion et al. |
| D548,544 S | | 8/2007 | Simpson |
| D592,919 S | | 5/2009 | Oliwa |
| D595,999 S | | 7/2009 | Teinowitz |
| 8,672,373 B1 | | 3/2014 | Hartman |
| D702,095 S | | 4/2014 | Fugett |
| 8,709,362 B2 | | 4/2014 | Leventhal et al. |
| 9,241,599 B2 | | 1/2016 | Cooper et al. |
| 9,254,065 B2 | | 2/2016 | Floyd et al. |
| D753,450 S | | 4/2016 | Lessel |
| D756,176 S | | 5/2016 | Lessel |
| 2002/0108256 A1 | | 8/2002 | Egelund et al. |
| 2006/0181094 A1 | | 8/2006 | Tarlow et al. |
| 2008/0030034 A1 | | 2/2008 | Balaciano |
| 2012/0297548 A1 | | 11/2012 | Solari |
| 2013/0305893 A1 | | 11/2013 | Kaufman et al. |
| 2015/0035301 A1 | * | 2/2015 | Aghamalian .......... A47G 21/10 294/24 |
| 2015/0250361 A1 | * | 9/2015 | Marion .................. A45D 40/00 15/105 |

\* cited by examiner

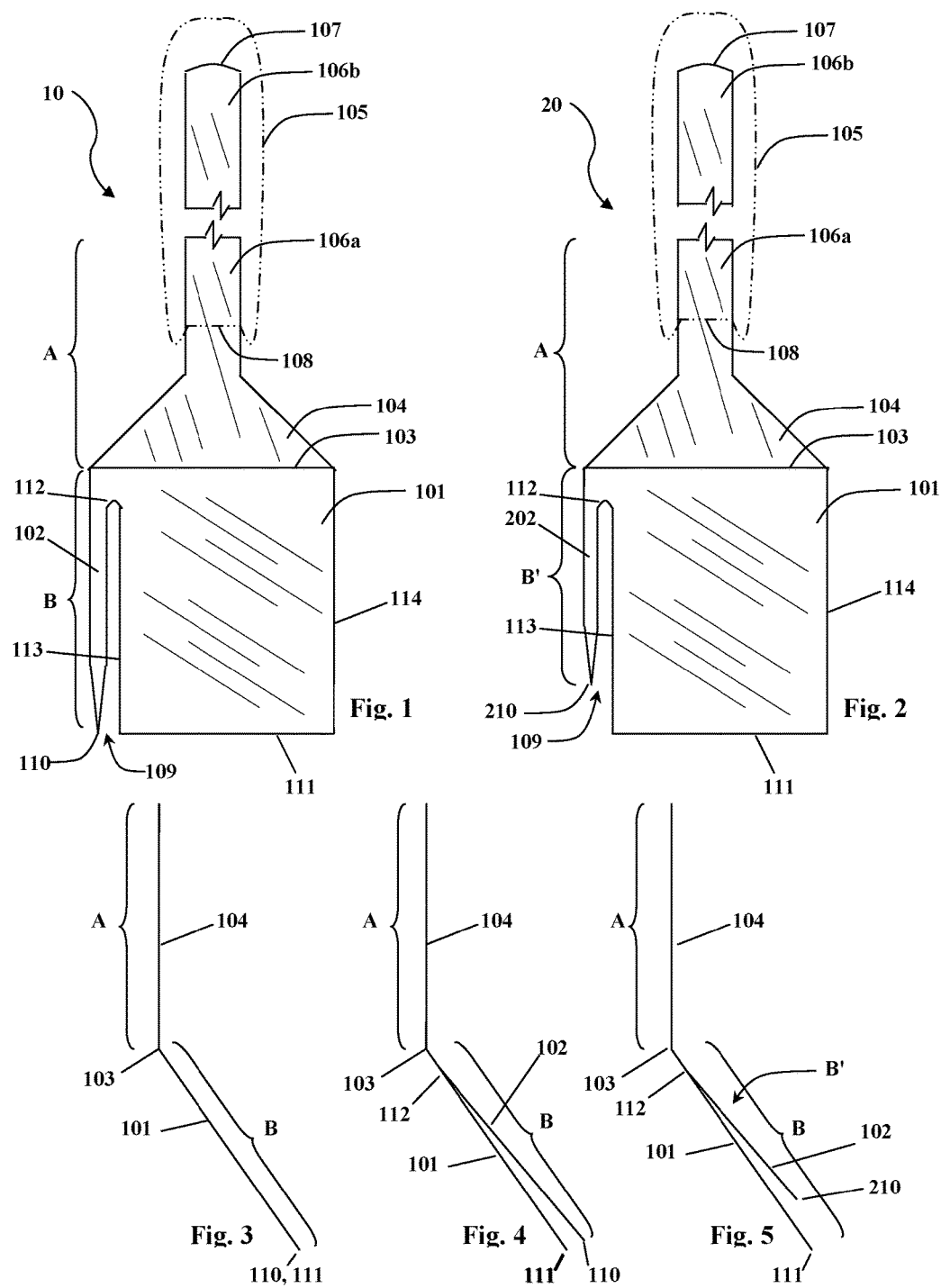

SPATULA FORK

BACKGROUND OF THE INVENTION

The field of the present invention relates generally to culinary implements. More particularly, the present invention is directed to a spatula that may be used to lift an item by either inserting itself between the item and the surface upon which the item rests or skewering the item. The present invention provides a novel and improved implement of such capability.

Grilling is a common activity. Generally, when doing so, one is handling a variety of different foods at one time, preferably employing the use of both a spatula to flip steaks or hamburgers and a fork to turn hot dogs or chicken or vegetables, for example. Keeping multiple tools handy and clean is certainly doable, but also challenging in many scenarios. Far better to incorporate both the scooping and skewering functions into a single implement.

The basic concept combining a fork function with a spatula function is not new. The patent literature includes disclosures of prior attempts at creation of such a combination implement, including, for example, U.S. Pat. Nos. 3,464,730, 4,768,819, 4,844,525, 4,955,971, 7,100,953 and US Patent Applications 2008/0030034 and 2013/0305893. Each of them presents complexity that takes away from the potential utility of such a combination implement. They each suffer from the complexity of moving parts requiring buttons or sliding elements to use one function of the combination tool over another. Such complexity loses the distinct and compelling usefulness of such a tool, leaving open the need for a culinary tool that simply and conveniently serves as both spatula and fork without need for any button, sliding element, or the like.

In the end, what is needed is a tool capable of being inserted between an item and the surface on which it rests and that includes a prong or two for skewering the item as an alternative mode of manipulating foods being cooked on a grill, as one example. The following description presents just such a solution to the want of a tool that combines the functions of spatula and fork requiring not a single moving part, not a single button, not a single sliding motion on the implement to make one or another function available.

SUMMARY OF THE INVENTION

One embodiment provides a spatula, comprising: a shank that has a distal end; a blade that is substantially flat and has a top side, a bottom side, and a distal edge; and a prong disposed adjacent to the blade. The embodiment can provide for the blade and the prong to be connected to the distal end of the shank. The present invention includes the combination of fork and spatula where the fork is not located centrally on the implement nor is it located above the level of the spatula blade except to the extent in those embodiments where the fork prong is angled above the plane of the spatula blade.

Another embodiment provides a spatula wherein the blade and the prong are separated from one another by a void channel.

Another embodiment provides a spatula wherein the shank and the blade form an oblique angle with respect to the top side of the blade.

Another embodiment provides a spatula wherein the oblique angle ranges between about 165° and about 135°.

Another embodiment provides a spatula wherein the blade comprises a metal or a plastic, wherein further the plastic is substantially heat-resistant; or wherein the metal is coated in silicone.

Another embodiment provides a spatula wherein the prong and the blade are co-planar.

Another embodiment provides a spatula wherein the distal edge of the blade and the distal tip of the prong are substantially equidistant from the distal end of the shank.

Another embodiment provides a spatula wherein the prong is shorter than the blade.

Another embodiment provides a spatula wherein the prong is angled between about 3° and about 10° above the top side of the blade.

Another embodiment provides a spatula wherein the distal edge of the blade and the distal tip of the prong are substantially equidistant from the distal end of the shank.

Another embodiment provides a spatula that further comprises a handle; wherein, optionally, the shank is disposed within the handle or the shank is coextensive with the handle.

Another embodiment provides a spatula wherein the prong has more than one tine.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows a top view of an embodiment of the present invention.

FIG. 2 shows a top view of another embodiment of the present invention.

FIG. 3 shows a side view of embodiments of the present invention where the spatula blade 101 and prong 102 are co-planar.

FIG. 4 shows a side view of embodiments of the present invention where the spatula blade 101 and prong 102 are not co-planar and have substantially the same length, ending at edge 111 and point 210, respectively.

FIG. 5 shows a side view of embodiments of the present invention where the spatula blade 101 and prong 102 are not co-planar but have substantially different lengths such that the length of the spatula blade 101 is substantially longer than that of the prong 102, ending at edge 111 and point 210, respectively.

DETAILED DESCRIPTION OF THE INVENTION

In one example, the present invention comprises a culinary tool suitable for use in grilling foods, among other culinary uses, which are not intended to be limitative. In particular, the culinary tool combines the functions of a spatula and a fork in a novel manner that permits the user to manipulate a variety of foods requiring scooping or skewering actions on the grill without need to switch tools.

Described herein is a spatula of the present invention, comprised of a shank that has a proximal end and a distal end relative to the ordinary manner by which the spatula is used, i.e., the proximal end of the shank is toward the handle end of the implement and the distal end is toward the "business" end of the implement where food is manipulated. The inventive spatula is also comprised (at its business end) of a blade that is substantially flat and has a top side, a bottom side, two side edges and a distal edge. The inventive spatula includes, as well, a prong disposed adjacent the blade, separated by a void channel. The blade and the prong are connected to the distal end of the shank; the prong can be to the right or to the left of the blade. And the prong can be a single tine or it can be multiple tines. Lastly, the spatula of the present invention comprises a handle. The shank can serve as the handle for the inventive spatula or the shank can be disposed within the handle where a separate handle material is employed. In that case, the shank serves to anchor the business end of the spatula to the handle material.

Aspects of the present invention may be better understood in reference to the figures.

Referring to FIG. 1, this figure describes a first embodiment 10 of the present invention where the prong 102 and the blade 101 have substantially the same length B; in other words, the distal edge 111 of the spatula blade and the distal tip 110 of the prong are substantially equidistant from the distal end of the shank 103. In contrast, second embodiment 20 shown in FIG. 2 has a prong 202 having length B' whereas the blade 101 has the same length B, such that prong tip 210 of the second embodiment is shorter than prong tip 110 of the first embodiment; and, in other words, the prong is shorter than the spatula blade. In all other respects, the embodiments shown in FIGS. 1 and 2 are the same, as indicated by use of the same numeric identifiers of their respective components.

Accordingly, the embodiments of the present invention as shown in either FIG. 1 or 2 include a blade 101 that has two side edges 113, 114, a distal edge 111; a prong 102 or a prong 202, respectively, as more particularly described above; a shank 106a, 106b whose length optionally ends at point 107 for those embodiments that either (1) include the shank having a substantially co-extensive length with that of a separate handle material 105 or (2) employ the shank itself as the handle. For those embodiments that employ a separate handle material 105, the shank can be substantially less than co-extensive in length with the handle material, as exemplified in FIGS. 1 and 2 by use of a shank represented by shank portion 106a alone, in which case the proximal end of the shank would end toward, but not at, the distal end of the handle material 105. Alternatively, the shank portion can be of any length so long as the shank portion sufficiently anchors the spatula to the handle material.

The shank portion can include a roughened surface (not shown) that faces the interior of the handle material and facilitates melding of the handle material to the shank portion. The shank portion, in an alternative embodiment, can be contoured along its length such that the proximal portion is wider than its distal portion, and the interior of the handle portion is complementarily so contoured, or vice versa, respectively, thereby creating a means for minimizing likelihood of separation of the shank portion from the handle material. In yet another embodiment, the shank portion is connected to the handle material by a fastening means, such as a glue, a rivet, a screw, a tongue and groove connection, a weld, a pin, or the like, all of which are well-known in the art. Another embodiment includes a threaded portion on the shank at its proximal end so that the shank is attached to the handle by screwing it into the handle. Other embodiments employ a combination of two or more of the approaches set forth above for assembling the shank portion and handle material.

The handle material can be manufactured using metallic, ceramic, polymeric, or wooden materials, without limitation intended. Suitable metallic materials include stainless steel, copper, and bronze, without intending limitation as to other metallic materials. Suitable polymeric materials include nylon, polyvinylchloride, silicone, or the like, without intending limitation. Any species of wood can be usefully employed as a handle material as well.

The shape of the handle material can be ovoid, round, rectangular, even flat; any shape readily gripped by a user will work and is open to standard design choices of a routineer of the art. As shown in FIGS. 1 and 2, the drawings are consistent with a tubular round or ovoid shape as delineated by the dashed line (( — ·· — ·· — )) in the presented spatulas 10 and 20. As shown, embodiments of the present invention that include handle material as well as the shank portion can start the handle material at a position 108 that is toward the distal end of the shank portion.

The spatula blade 101 can be substantially flat or it can have a slight bend. It is manufactured from a a metal or a plastic, which is preferable substantially heat-resistant. Suitable metallic materials for the spatula blade include stainless steel, copper, and bronze, without intending limitation as to other metallic materials. Suitable polymeric materials include nylon, polyvinylchloride, silicone, or the like, without intending limitation. In one embodiment, the spatula blade is formed from a metal that is coated in silicone.

The embodiments illustrated by FIGS. 3-5 include contact between the distal portion of the shank 104 and the spatula blade 101 such that they describe an oblique angle with respect to the top side of the implement. In most embodiments of this configuration, the oblique angle ranges from about 165° to about 135°, or from about 165° to about 145°, or from about 165° to about 155°; or the oblique angle is about 160°.

In some embodiments, as indicated in FIG. 3, the prong and the spatula blade 101 are co-planar irrespective of the length of the prong. However, in other embodiments, as shown in FIGS. 4 and 5, the prong 110 or 210 is angled above the top side of the spatula blade 101. The acute angle between the prong 110 or 210 is between about 3° and about 10°, or between about 3° and about 8°, or between about 3° and about 6°, or between about 3° and about 5°; or is about 3°, or about 4°, or about 5°. The distal edge of the spatula blade 111 and the distal tip of the prong 110, in some embodiments having the angled-up prong, are substantially equidistant from the distal end of the shank, as illustrated in FIG. 4. In other embodiments having the angled-up prong, the prong is shorter than the spatula blade, as illustrated in FIG. 5.

Using the shank portion itself as a handle involves certain design choices as to its shape, all of which are well within the scope of a routineer's purview. In some embodiments, the proximal shank portion 106b can be rendered broader and/or thicker than the distal shank portion 106a. In so doing, the thicker, rounder proximal portion 106b of such embodiments facilitates the shank portion's role as a handle. Similar to this design choice of the shank serving as the handle, one can also elect to use a metallic handle that is attached to a shank 106a, thus providing the appearance of a single shank/handle combination that is in fact a shank attached to the handle material.

The shank portion itself can be straight as shown in FIGS. 1-5, where the length A of the distal end of the shank portion 104 is represented as a straight line segment. In other embodiments (not shown), the shank portion can have a bend at or about position 108 that results in an oblique angle between the shank portion and the plane of the blade 101. Such a bend there in combination with a substantially right angle bend at position 103, for example, between the distal-most shank portion and the proximal-most blade, would result in a spatula that included a "backstop" that may be useful in manipulating a food on a grill.

The prong 102 or 202 is shown in FIG. 1 or 2, respectively, to the left of the spatula blade 101 as one looks down on the top side. The prong can be positioned to the right or the left relative to the spatula blade. The implement designed with right-handed users in mind may be more convenient having the prong positioned as shown in FIGS. 1 and 2. But, with left-handed users in mind, the implement may be more convenient having the prong position to the right of the spatula blade as viewed from above the top side (not shown). Both configurations are contemplated as part of the present invention. Irrespective of configuration relative to handedness of user, the void channel 109 between the prong 102 or 202 and the spatula blade side edge 113 can have any length including that shown in FIGS. 1 and 2 at position 112. Position 112 in the illustrated embodiments is proximate to the inflection at position 103 as a means to provide strength to the prong. Position 112, however, can be altered distally or proximally to suit designs wants and needs, at will.

Other aspects of the present invention can also be altered to suit design wants and needs. For example, the spatula blade 101 can be solid throughout or it can include apertures or slots (not shown) of any shape through which liquid can flow. Also, the shape of the spatula blade can be rectangular with sharp edges on either side of the distal edge 111 as shown in FIGS. 1 and 2 or the edges can be blunted or rounded (not shown). As well, the spatula blade can be substantially flat as shown in FIGS. 1 and 2, or it can exhibit a curve, preferably concave as viewed from above, but a convex spatula blade is also contemplated as part of the instant invention (not shown). The spatula blade width can expand toward its distal edge as yet another embodiment (not shown). The prong 102 or 202 can encompass a single tine as shown in FIG. 1 or 2, respectively, or, in other embodiments, the prong can encompass multiple tines, e.g. two or three (not shown).

While preferred embodiments of the present invention have been shown and described herein, it will be obvious to those skilled in the art that such embodiments are provided by way of example only. Numerous variations, changes, and substitutions will now occur to those skilled in the art without departing from the invention or the definitions provided herein for clearly recording inventor's conception and embodiments thereof. It should be understood that various alternatives to the embodiments of the invention described herein may be employed in practicing the invention.

What is claimed is:

1. A spatula, comprising:
   a. a shank that has a distal end;
   b. a blade that is substantially flat and has a top side, a bottom side, and a distal edge; and
   c. a prong for skewering disposed adjacent to the blade;
wherein the blade and the prong are substantially co-planar and connected to the distal end of the shank.

2. The spatula of claim 1, wherein the blade and the prong are separated from one another by a void channel.

3. The spatula of claim 2, wherein the shank and the blade form an oblique angle with respect to the top side of the blade.

4. The spatula of claim 3, wherein the oblique angle ranges between about 165° and about 135°.

5. The spatula of claim 4, wherein the blade comprises a metal or a plastic, wherein further the plastic is substantially heat-resistant.

6. The spatula of claim 5, wherein the metal is coated in silicone.

7. The spatula of claim 6, wherein the prong and the blade are co-planar.

8. The spatula of claim 7, wherein the distal edge of the blade and the distal tip of the prong are substantially equidistant from the distal end of the shank.

9. The spatula of claim 7, wherein the prong is shorter than the blade.

10. The spatula of claim 6, wherein the prong is angled between about 3° and about 10° above the top side of the blade.

11. The spatula of claim 10, wherein the distal edge of the blade and the distal tip of the prong are substantially equidistant from the distal end of the shank.

12. The spatula of claim 10, wherein the prong is shorter than the blade.

13. The spatula of claim 6, further comprising a handle.

14. The spatula of claim 13, wherein the shank is disposed within the handle.

15. The spatula of claim 14, wherein the shank is coextensive with the handle.

16. A spatula, comprising:
   a. a shank that has a distal end;
   b. a blade that is substantially flat and has a top side, a bottom side, and a distal edge;
   c. a prong for skewering an object;
wherein the blade and the prong are adjacent one another, substantially co-planar, and connected to the distal end of the shank along a common line segment.

17. The spatula of claim 16, further comprising
   d. a void channel disposed between the prong and the blade that at its distal end has a width that is at least the largest width of the prong.

18. A spatula cooking tool, comprising,
   a. a shank having a handle at one end and an opposed distal end,
   b. a blade that is substantially flat and has a top side, bottom side, two side edges and a distal end, wherein said blade is attached to the distal end of said shank and extends outwardly toward said distal end,
   c. a prong attached to said distal end of said shank positioned adjacent to said blade and in substantially planar alignment therewith, and having a length substantially the same as said blade and having a predetermined width, wherein said prong is spaced from one side edge of said blade a distance approximately equal to the predetermined width of said prong thereby creating a void between said prong and said blade,
whereby said blade and said prong present a combination fork and spatula cooking tool.

* * * * *